United States Patent [19]

Allen et al.

[11] Patent Number: 4,550,326

[45] Date of Patent: Oct. 29, 1985

[54] FLUIDIC TUNING OF IMPULSE JET DEVICES USING PASSIVE ORIFICES

[75] Inventors: Ross R. Allen, Ramona; Daniel E. Allen, Escondido, both of Calif.

[73] Assignee: Hewlett-Packard Company, Palo Alto, Calif.

[21] Appl. No.: 490,753

[22] Filed: May 2, 1983

[51] Int. Cl.[4] .............................................. G01D 15/18

[52] U.S. Cl. .................................................. 346/140 R

[58] Field of Search .............................. 346/75, 140 R

[56] References Cited

U.S. PATENT DOCUMENTS

| | | | |
|---|---|---|---|
| 3,747,120 | 7/1973 | Stemme | 346/75 |
| 4,282,533 | 8/1981 | Brooks et al. | 346/75 |
| 4,395,720 | 7/1983 | Grover et al. | 346/140 R |

OTHER PUBLICATIONS

*Design of an Impulse Ink Jet,* Kyser et al., vol. 7, No. 3, 1981, Journal of Applied Photo. Engr'g.

*Primary Examiner*—E. A. Goldberg
*Assistant Examiner*—Gerald E. Preston
*Attorney, Agent, or Firm*—John A. Frazzini

[57] ABSTRACT

A nozzle plate for impulsive jet devices is proposed where the quality of ejected droplets is improved by means of additional non-emitting orifices. These orifices may act as fluid accumulators and tuned or untuned absorbers of pressure disturbances to optimize drop quality and reduce fluidic crosstalk between adjacent drop generators. The presence of these orifices permits additional degrees-of-freedom in the design of high-quality impulsive jet devices. Sufficient crosstalk reduction results that crosstalk reduction barriers can be eliminated.

4 Claims, 12 Drawing Figures

FLUIDIC TUNING OF IMPULSE JET DEVICES USING PASSIVE ORIFICES

BACKGROUND OF THE INVENTION

The disclosed invention relates in general to ink-jet devices and more particularly to a structure and method for improving print quality by use of non-emitting orifices. There are a variety of ink jet printers and plotters which produce drops by various means including continuous-jet emitters, in which droplets are generated continuously at a constant rate under constant ink pressure, electrostatic emitters, and drop-on-demand emitters (i.e. impulse jets). These emitters include means for producing a droplet, a nozzle to form the droplet, means for replacing the ejected ink and a power source to energize ejection of the droplet. The nozzles are used to control the shape, volume, and/or velocity of ejected droplets. Such devices typically employ either a single nozzle or a plurality of nozzles formed in a nozzle plate and arranged in a linear or a planar pattern. In impulse jets, pressure pulses are controllably produced in the ink in the vicinity of an emitter to eject one or more droplets of ink through the emitter nozzle. In one type of impulse jet, piezoelectric transducers are utilized to produce the pressure pulses. In another type of impulse jet, electric heaters are utilized to vaporize small regions of the ink to produce the pressure pulses.

In an impulse jet device, it is generally difficult to obtain the combination of pressure pulse, fluid properties, nozzle geometry and refill dynamics which produce a single drop with high velocity and good directional control. In thermal (vapor bubble) ink jet devices and in piezoelectric tranducer ink-jet devices, it is difficult to control the time-history of the pressure pulse. This can compromise the quality of ejected drops because reflow of fluid back into the nozzle due to vapor bubble collapse or piezoelectric transducer relaxation can occur at such time that drop breakoff is adversely affected, such as by producing undesired satellite droplets and/or by deflecting the ejected droplet.

In multi-emitter devices, each emitter is usually connected to a common ink supply plenum. When a pressure pulse is produced in the ink in one emitter, the pressure pulse will be transmitted via the common ink plenum to nearby emitters. Such pressure pulse transmission results in fluidic crosstalk between emitters. This crosstalk can affect the quality of ejected drops through uncontrolled reinforcement or partial cancellation of pressure pulses. In severe cases, a droplet can be ejected out of a nozzle by activating one of its neighbors.

To reduce fluidic crosstalk, existing impulse jet devices typically include a barrier between adjacent emitters to prevent direct transmission of a pressure pulse from one emitter to another. To enable each emitter to refill with ink after ejection of one or more droplets of ink, each emitter is connected to the common ink plenum by a refill channel through the barrier. The amount of crosstalk transmitted via these refill channels can be reduced by increasing the impedance (due to viscosity and inertance) of these channels. Unfortunately, an increase in impedance of a refill channel can detrimentally affect drop quality and reduce maximum drop ejection rate by retarding the rate at which an emitter refills after ejection of a droplet. Thus, because in previous designs the crosstalk impedance is primarily determined by the impedance of the refill channel, a tradeoff exists between repetition rate, drop quality and reduction of fluidic crosstalk.

In co-pending U.S. Pat. application Ser. No. 444,108 entitled A SELF-CLEANING INK JET DROP GENERATOR HAVING CROSS TALK REDUCTION FEATURES filed by Ross R. Allen on Nov. 24, 1982, additional crosstalk reduction is achieved by a plurality of non-emitting drain holes in the nozzle plate connecting the common ink plenum to the ambient atmosphere. At the opening of each refill channel to the common ink plenum is located a drain hole, referred to as an isolator, for the purpose of absorbing and dissipating some of the pressure pulses transmitted into or out of its associated refill channel. These isolators thus enable crosstalk reduction without a concomitant increase in refill channel impedance. However, even in this design, the limited refill rate of an emitter through its narrow refill channel can affect drop quality and reduce the maximum rate of droplet ejection. It should be noted that, although the problems discussed here and the preferred embodiment discussed below, are illustrated in terms of a thermal ink jet device, the same discussion applies to piezoelectric transducer jet devices and other impulse jet devices.

SUMMARY OF THE INVENTION

In FIG. 1 is shown a typical shape of a droplet 10 as the droplet is being ejected from an emitter 11 of a thermal ink jet device. In this figure, the droplet is shown as it is being ejected through a nozzle 12 in a nozzle plate 13 of the thermal ink jet device. In such a thermal ink jet emitter, the droplet is ejected as a result of the production of a vapor bubble 14 in the ink 15 adjacent to nozzle 12. To reduce crosstalk, a barrier 16 extends between nozzle plate 13 and a back plate 17 of the device to prevent direct transmission of a pressure pulse in the ink to nearby ink jet emitters. To replace the ink ejected in the droplet, a refill channel 18 through barrier 16 connects nozzle 12 to a common ink refill plenum (not shown in the figure). In general, a high refill impedance is necessary to reduce crosstalk due to transmission of drive energy into the refill plenum. On the other hand, high throughput demands low refill impedance to reduce refill time.

It has been shown in computer simulations and physical experiments that a high refill impedance creates a drop with a long slow tail (as shown in FIG. 1) because refill of the emitter comes from fluid reflowing from the emitter nozzle 12. In particular, as bubble 14 collapses during ejection of droplet 10, if reflow of ink into the volume left by the collapsing bubble is due primarily to the flow of ink from nozzle 12 (as shown by fluid flow vectors 19) rather than to flow of ink from refill channel 18 (as shown by fluid flow vectors 110) then meniscus 111 is drawn into nozzle 12 resulting in a long tail 112 on droplet 10. This produces rearward axial velocities in the tail (shown by fluid flow vectors 113) and in the emitter (shown by fluid flow vectors 19) while the bulk of drop 10 has forward velocity (shown by fluid flow vectors 114). The velocity difference between the tail and the bulk of the droplet results in the tail being drawn out to a thin, unstable capillary which is likely to break up into satellite droplets accompanying the primary droplet. These satellite droplets can produce unwanted satellite marks on a recording on which the droplets are directed and if the break-off of the tail is not coaxial with the elongated droplet, then the break-off can produce an unwanted deflection of the primary droplet.

When refill comes primarily from refill channel 18 and not nozzle 12, the droplet meniscus retraction is limited and drop breakoff may occur outside of the nozzle. In this case, the breakoff may occur at a point in the tail where the fluid flow velocity is zero or possibly a small positive velocity (i.e. away from the emitter). Momentum developed in the refill channel during drive relaxation may push the meniscus out of the nozzle and aid breakoff. This situation is illustrated in FIG. 2 where the meniscus 211 is extended slightly outside of nozzle 22. The fluid flow vectors 210 indicate that the collapsing vapor bubble draws fluid primarily from the refill channel 28 rather than from nozzle 22. With smaller axial velocity differences between the leading and trailing surfaces of the droplet, the droplet has a smaller length to diameter ratio enhancing its stability. As a result of this, rather than breaking into several drops, surface tension pulls the droplet into a single sphere within a few nozzle diameters along its trajectory.

Another problem with excessive nozzle reflow is the entry of the meniscus deep within the nozzle. Refill is driven by the negative gage pressure produced by the collapsing bubble and later by the nozzle meniscus. In some cases when the meniscus is withdrawn deeply into the nozzle, air can be trapped in the emitter, resulting in a phenomenon known as gulping. Because such trapped air bubbles are much more compressible than the ink, these air bubbles will compress temporarily upon generation of a vapor bubble and associated pressure pulse, thereby diverting energy from the process of ejecting droplets. Such trapped air bubbles, in sufficient quantity, can prevent ejection of droplets from the emitter. In order to reduce the chance of gulping and to reduce meniscus retraction, this invention increases refill rate from the plenum.

In accordance with the illustrated preferred embodiment, an impulse ink-jet device is presented using non-emitting orifices to improve droplet quality, increase maximum droplet ejection rate and reduce fluidic crosstalk. Particularly when secondary marks (called satellites) are to be suppressed, the ejected drop must be stable in flight and not break up into droplets which deviate from the desired trajectory. This requires that the ink jet droplet emitter control volume and velocity distribution in the droplet so that drops are produced without spray and slow, trailing satellites.

The additional orifices serve as pressure pulse absorbers to reduce crosstalk and also serve as local fluid accumulators to increase the refill speed of emitters after ejection of one or more droplets. This increase in refill speed improves droplet quality and increases the maximum rate of droplet ejection. The particular location of these orifices will depend upon the size and pattern of emitters, but in general, it is advantageous to locate a plurality of these orifices in the neighborhood of each emitter.

To optimize the reduction of crosstalk, the locations of the orifices and the sizes and shapes of the orifices can be selected to tune the response of the fluid in these orifices in accordance with the characteristic frequencies of disturbances. The sizes and shapes of the orifices can also be selected to optimize their function as fluid accumulators. The top view cross-sectional shape of an orifice can be varied to vary the ratio of the stiffness of the ink meniscus in the orifice to the volume of ink in the orifice. The side view cross-sectional shapes can also be selected to make the effective stiffness of the meniscus greater during the intervals in which it is subjected to a pressure pulse than during the periods in which it is functioning as a local fluid reservoir for refill of a nearby emitter. The amount of crosstalk reduction provided by these emitters is sufficient to permit elimination of the barrier between emitters which is common in existing impulse jet devices. The elimination of the barriers enhances emitter refill speed by enabling fluid to flow to the emitter from all sides instead of just through a narrow refill channel. The elimination of the barriers also simplifies the fabrication of such devices.

DESCRIPTION OF THE PREFERRED EMBODIMENT

Figure 3:
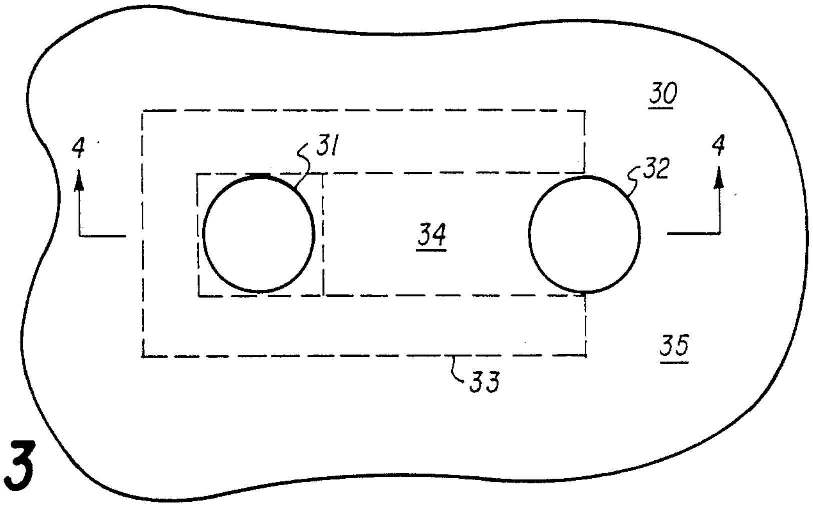
FIG. 3 shows an ink jet device having an emitter nozzle and associated non-emitting orifice.

In FIG. 3 is shown a portion of a thermal ink jet having crosstalk reduction barriers and non-emitting orifices. In that figure is shown an emitter nozzle 31 formed in a nozzle plate 30. The perimeter of the portion of the crosstalk reduction barrier associated with nozzle 31 is shown by the dotted lines 33. This barrier extends from nozzle plate 30 to a back plate (not shown in this figure). The nozzle plate is on the order of 0.25 inch by 0.25 inch by 0.004 inch thick and the nozzles are on the order of 0.003 inches in diameter with a spacing between adjacent nozzles on the order of 0.015 inches. A refill channel 34 through barrier 33 connects emitter nozzle 31 to an ink jet plenum 35 to supply ink to the nozzle to replace ejected ink droplets.

At or near the mouth of the refill channel where the refill channel opens into the plenum is a non-emitting orifice which functions as an isolator by absorbing energy from pressure pulses transmitted into or out of the mouth of the refill channel. In those devices having a crosstalk reduction barrier, typically some or all of the non-emitting orifices will be located at the mouths of refill channels. In general, a sufficient number of these orifices will be located near each emitter nozzle that crosstalk is reduced as much as possible without weakening the nozzle plate to a degree that allows it to flex away from the barriers or flex enough to absorb a significant fraction of the energy in pressure pulses used to eject droplets. The menisci in these orifices will also flex as ink is pushed into them during production of a vapor bubble, thereby diverting some of the vapor bubble energy from ejection of a droplet. The number and locations of the orifices should be selected so that a sufficient amount of energy from the vapor bubble is utilized in ejection of a droplet and the non-emitting orifices are not so close to emitters that droplets of ink are ejected from any of them when one or more emitters eject droplets. Typically, each non-emitting orifice is located several nozzle diameters away from its nearest emitters for most effective performance.

Figure 4:
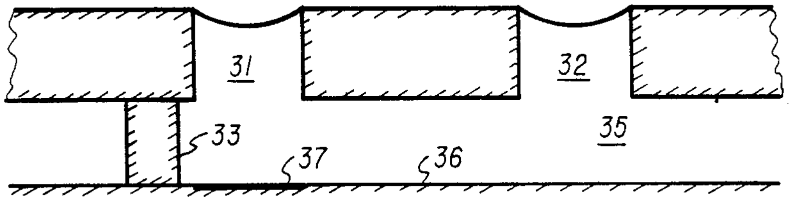
FIG. 4 is a side cross-sectional view of the ink jet device shown in FIG. 3.

The diameter of the orifice is on the order of the diameter of nozzle 31. Such an isolator reduces the amount of crosstalk transmitted from one emitter to another via the ink plenum. A side cross-sectional view of the ink jet device shown in FIG. 3 is shown in FIG. 4. This view shows a resistor 37 formed in the back plate 36 for production of vapor bubbles in the ink to eject droplets through nozzle 31. The distance between nozzle plate 30 and back plate 35 is on the order of 0.0015–0.004 inches.

Figure 5:
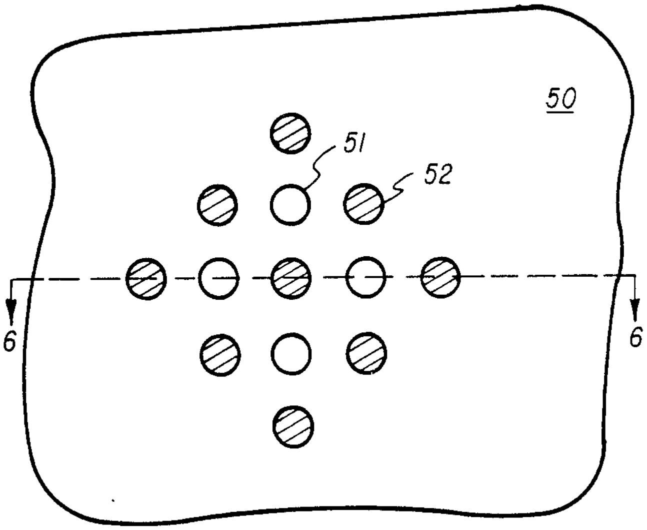
FIG. 5 is a top cross-sectional view of an ink jet device showing a representative pattern of emitter nozzles and non-emitting orifices.

In FIG. 5 is shown a top view of a portion of a nozzle plate 50 having a set of emitter nozzles 51 (shown as open circles) and a set of associated non-emitting orifices 52 (shown as cross-hatched circles 52). In this example, there are four emitter nozzles arranged in a diamond shape but clearly other patterns and other numbers of nozzles can be used as required. Similarly, non-emitting orifices 52 are shown as being located at points of a two-dimensional Cartesian grid of points, but other locations are also possible. This pattern of emitters and non-emitting orifices has sufficiently low crosstalk that no crosstalk reducing barrier is required for satisfactory operation.

Figure 6:
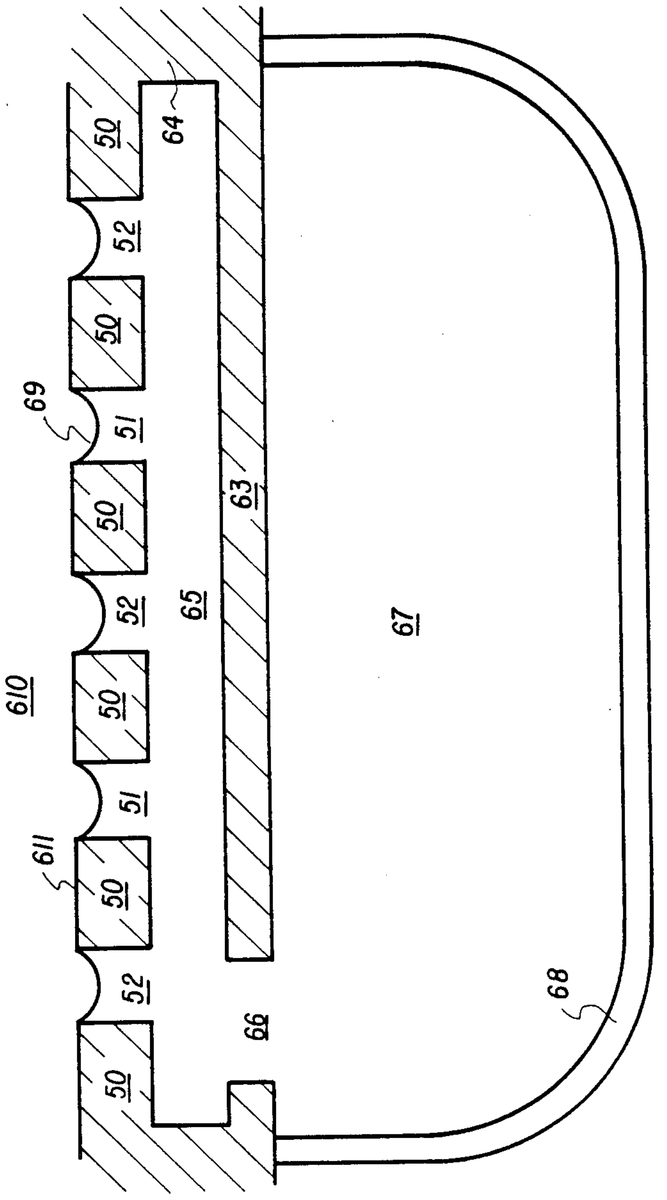
FIG. 6 is a side cross-sectional view of the ink jet device shown in FIG. 5.

In FIG. 6 is shown a side cross-sectional view (i.e. a cross-section in a plane perpendicular to the top surface of the nozzle plate) of the ink jet device shown in FIG. 5. In this view is shown the back plate 53 which is closed by side walls 64 extending between back plate 53 and nozzle plate 50 to form an ink plenum 65. The ink plenum is connected through a reservoir channel 66 in back plate 63 to an ink reservoir 67. The ink reservoir may be realized by a collapsible bladder 68 or by a foam filled space which is vented to the ambient atmosphere and which retains the ink in the foam by capillary action. Such a system enables ink to be drawn into ink plenum 65 to replace ink ejected through emitter nozzles 51. Emitter nozzles 51 and non-emitting orifices have sufficiently small cross-section (as shown in FIG. 5) that capillary action draws ink into them from plenum 65. This capillary action is sufficiently strong that ink is drawn into plenum 65 from reservoir 67, resulting in gradual collaple of ink reservoir 67 as ink is ejected by the emitters. In each of the emitter nozzles and non-emitting orifices, the ink forms a meniscus 69 at the interface between the ink and the ambient atmosphere 610. In general, the capillary action is sufficiently strong to form each of these menisci at the top surface 611 of nozzle plate 50.

Figure 1:
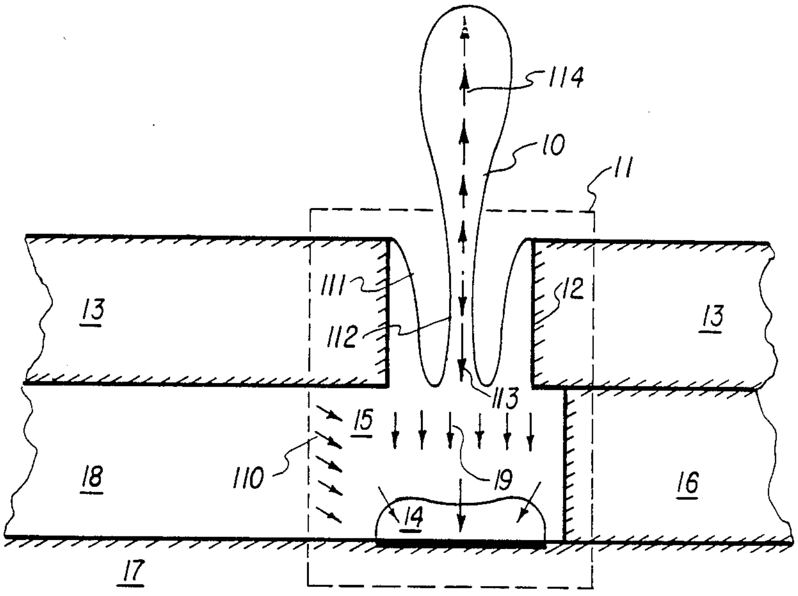
FIG. 1 (PRIOR ART)
FIG. 1 illustrates the effect on droplet ejection from an impulse ink jet emitter when there is an inadequate emitter refill rate.
Figure 2:
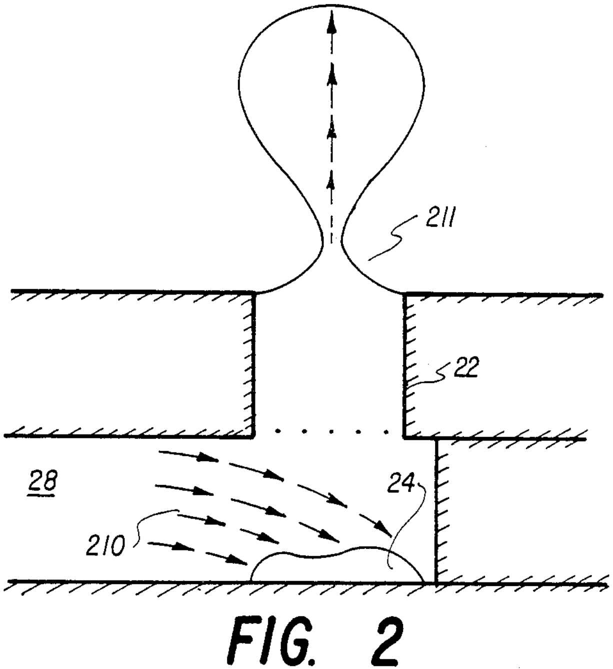
FIG. 2 illustrates the effect on droplet ejection from an impulse ink jet emitter when there is an adequate emitter refill rate.

It should be noted that, in the embodiment shown in FIGS. 5 and 6, no crosstalk reduction barriers are shown. It has been found that the non-emitting orifices in many patterns of nozzles produces sufficient crosstalk reduction that the crosstalk reduction barriers can be omitted. One advantage of such omission is a reduction in device complexity and associated production steps. A more important advantage is that each of the emitters can draw ink from all sides rather than just through a narrow refill channel. This results in a large reduction of the refill impedance of each of the emitters so that even during the initial stages of refill, ink flow comes primarily from the plenum instead of from the emitter nozzle. As a result of this, the meniscus of an emitter is not drawn into the nozzle as in FIG. 1 so that drop quality is improved, maximum droplet ejection rate is increased and the risk of gulping is reduced.

Figure 7A:
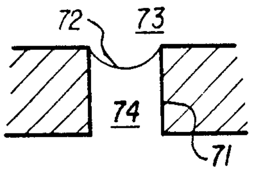
FIG. 7A shows the meniscus in a non-emitting orifice during a quiescent period between droplet ejection from nearby emitters.
Figure 7B:
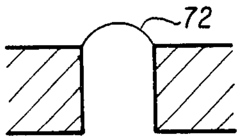
FIG. 7B shows the meniscus in a non-emitting orifice during the period of expansion of a vapor bubble in an adjacent emitter.
Figure 7C:
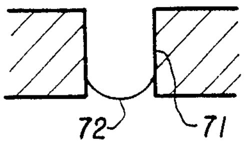
FIG. 7C shows the meniscus in a non-emitting orifice during the period of contraction of a vapor bubble in an adjacent emitter.

The non-emitting orifices not only serve as crosstalk reducers, but also serve as local fluid accumulators which supply ink to adjacent emitters during the initial stages of emitter refill. The role that these orifices play in refill of the emitters is illustrated in the side cross-sectional views shown in FIGS. 7A–7C. In FIG. 7 is shown, during a quiescent period between the ejection of ink droplets from adjacent emitters, an orifice 71 and the shape and position of the meniscus 72 between the ambient atmosphere 73 and the ink 74. The ink is usually held at a small negative gage pressure (on the order of 1–3 inches of water) so that the meniscus is concave and fluid does not leak out of the head. The diameter of the orifice is sufficiently small (on the order of 0.003 inches) that the capillary force overcomes this negative gage pressure and draws to the top of the orifice the point of attachment of the meniscus to the sides of the orifice. The nozzle diameter is sufficiently small that the meniscus shape is substantially spherical.

The shape of the meniscus during the period of expansion of the vapor bubble is shown in FIG. 7B. The pressure pulse associated with the bubble expansion in an emitter produces in non-emitting orifices adjacent to the emitter a positive gage pressure that produces a spherical convex meniscus. The excess fluid in the meniscus in FIG. 7B over that present in FIG. 7A is available to refill the emitter during the period of bubble collapse in the emitter. By locating several non-emitting orifices near each of the emitters, a significant local accumulation of ink for refill of the emitter becomes available to the emitter. As the bubble collapses, a sufficient negative gage pressure is generated in adjacent non-emitting orifices to overcome the capillary force and draw the point of attachment of the meniscus to the sides of the orifice down into the orifice thereby making a further amount of ink available from these orifices for quick refill of the emitter. This results in a low refill impedance for the emitter and reduces the amount of ink drawn by the collapsing vapor bubble from the emitter nozzle. The depressed meniscus preserves the negative head temporarily and assists in drawing fluid from the remote ink reservoir to refill the emitter and adjacent non-emitting orifices.

The shapes and sizes of the orifices can be selected to improve the response of the menisci in these orifices. In particular, it is desirable that the orifices be relatively stiff during the period of bubble expansion to reduce the risk of one or more of these menisci rupturing or ejecting a droplet and to reduce the fraction of energy in the vapor bubble diverted from ejection of a droplet to movement of the orifice menisci. For an orifice having a circular cross-section, the stiffness of the meniscus (i.e. the pressure difference across the meniscus) varies inversely as the radius of the orifice. Therefore, during expansion of a vapor bubble, it is advantageous to have a small radius orifice. On the other hand, to increase the volume of fluid available from an orifice during vapor bubble contraction and to reduce the resistance to providing this fluid, it is advantageous to have a large radius orifice. Both of these advantages can be achieved by use of a conical orifice which is narrow at the top (i.e. at the side of the nozzle plate in contact with the ambient atmosphere) than at the bottom (i.e. at the side of the nozzle plate in contact with the ink plenum). Such an orifice 81 is shown in FIGS. 8A and 8B.

Figure 8A:
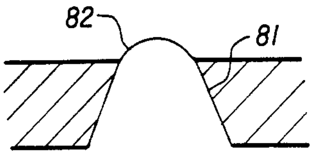
FIG. 8A is a side cross-sectional view of the meniscus in a tapered passive orifice during the period of expansion of a vapor bubble in an adjacent emitter.
Figure 8B:
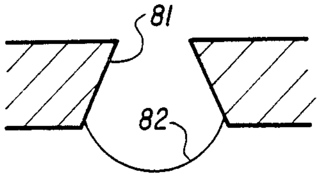
FIG. 8B is a side cross-sectional view of the meniscus in a tapered passive orifice during the period of refill of an adjacent emitter.

In FIG. 8A is shown in a side cross-sectional view the meniscus 82 during the period in which the vapor bubble is expanding. During that period, the meniscus is at the top of the orifice so that the resulting meniscus has relatively high stiffness. In FIG. 8B is shown the meniscus 82 during the period in which the vapor bubble is contracting. During that period, the meniscus is drawn into the orifice where the cross-section of the orifice has a larger radius, thereby yielding a larger cross-section and a meniscus having lower stiffness.

Figure 9:
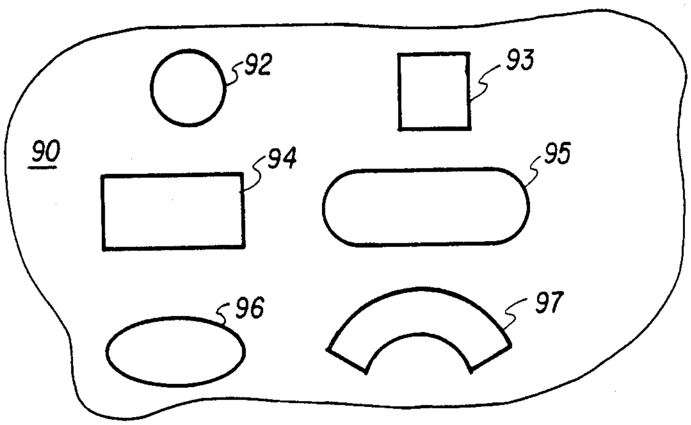
FIG. 9 is a top cross-sectional view of a nozzle plate having orifices of a variety of shapes.

The shape of the cross-section of an orifice can also be chosen to improve the response of the fluid in the orifice. For an orifice having a circular cross-section, the stiffness of the meniscus increases and the volume of the orifice decreases as the radius of the orifice decreases so that the chosen radius is a compromise between these two parameters. This constraint of circular geometries can be eliminated by use of non-circular cross-sectional shapes. In FIG. 9 are shown in the top surface of a nozzle plate 90 the openings of a set of orifices 92–97 having a non-circular cross section in the plane at the top surface of nozzle plate 90. For a general meniscus having two principal radii of curvature $r_1$ and $r_2$, the stiffness equals the surface tension times the sum of $1/r_1$ and $1/r_2$. For the circular and square cross-sections of orifices 92 and 93, $r_1 = r_2$ so that there is only one degree of freedom in controlling both meniscus stiffness and cross-sectional area. In the other shapes, such as rectangle 94 and ellipse 96, the ratio of stiffness to area can be varied. Even more exotic shapes such as the rectangle 95 having rounded ends and the section of an annular ring 97 can also be chosen if desired. An annular ring shape 97 centered on a nozzle would have the advantage of producing an orifice having both a relatively high stiffness and surface area in close proximity to the nozzle. The locations, shapes and sizes of the orifices can be chosen to tune the response of the menisci to the shapes of the pressure pulses produced by droplet ejection.

Although the discussion above has been in terms of thermal ink jet emitters, the discussion also applies to other types of impulse jet emitters such as piezoelectric transducer emitters in which the discussion of bubble collapse is replaced by a discussion of the effects of the relaxation in the piezoelectric transducer and constricting structure (such as a tube or capillary constricted by the piezoelectric transducer). The discussion has also referred to the orifices as non-emitting orifices. These orifices will generally not have an associated means for ejecting droplets (such an orifice will be referred to herein as permanently non-emitting orifices), but in other devices, the non-emitting orifices can have an associated means for ejecting droplets. For example, the device might include an entire array of emitters, only a controlled few of which are utilized as emitters at any given time. This has the advantage that if one of these emitters fails, then another subset of the emitters can be selected electronically to serve as active emitters. This would enable a set of back-up emitters to be built-in to the device. The non-active emitters would thus serve as non-emitting orifices.

We claim:

1. An improved impulse jet device of the type in which a fluid is supplied from a source of fluid to at least one emitter, each emitter having means for ejecting droplets of ink through an associated nozzle in a nozzle plate, said nozzle plate including at least one non-emitting orifice adjacent to each of the nozzles, wherein, in the improved impulse jet device, at least one of the non-emitting orifices is an emitter and said improvement comprises means for inactivating the emitter which is to serve as a non-emitting orifice.

2. An improved impulse jet device of the type in which a fluid is supplied from a source of fluid to at least one emitter, each emitter having means for ejecting droplets of ink through an associated nozzle in a nozzle plate, said nozzle plate including at least one non-emitting orifice adjacent to each of the nozzles, wherein, in the improved impulse jet device the nozzle plate has a top surface in contact with the ambient atmosphere and wherein said at least one non-emitting orifice forms at said top surface an opening that is a section of an annular ring centered on a nozzle.

3. An improved impulse jet device of the type in which a fluid is supplied from a source of fluid to at least one emitter, each emitter having means for ejecting droplets of ink through an associated nozzle in a nozzle plate, said nozzle plate including at least one non-emitting orifice adjacent to each of the nozzles, wherein, in the improved impulse jet device, in a side cross-sectional view of the orifice, the orifice has a nonrectangular cross-section.

4. An impulse jet device as in claim 3 wherein the nozzle plate has a top surface in contact with the ambient atmosphere, wherein the orifice has an opening at the top surface of the nozzle plate and wherein, in a side cross-sectional view of the orifice, the orifice has a cross-section that converges in the directional toward the opening at the top surface of the nozzle plate.

* * * * *